United States Patent [19]
Dohrmann et al.

[11] Patent Number: 5,522,468
[45] Date of Patent: Jun. 4, 1996

[54] ONBOARD WEIGHT INDICATOR FOR MEASURING THE LOAD APPLIED TO A VEHICLE AXLE

[76] Inventors: David K. Dohrmann, 11 Valley Pride, So. Hutchinson, Kans. 67505; Doyle P. Perser, 301 West A, Partridge, Kans. 67566

[21] Appl. No.: 125,533
[22] Filed: Sep. 22, 1993
[51] Int. Cl.⁶ .................................................. G01G 19/08
[52] U.S. Cl. .................................... 177/136; 177/137
[58] Field of Search ......................... 177/136, 137, 177/244, 256, 257, 258, 259, 184, 187, 188

[56] References Cited

U.S. PATENT DOCUMENTS

| | | | |
|---|---|---|---|
| 746,895 | 12/1903 | Stevens | 177/136 |
| 3,580,343 | 5/1971 | Hogue | 177/136 |
| 3,648,790 | 3/1972 | Bishop | 177/137 |
| 3,857,093 | 12/1974 | Green | 177/137 |
| 3,955,636 | 5/1976 | Askew | 177/137 |
| 4,449,597 | 5/1984 | Ricciardi et al. | 177/256 |
| 4,623,029 | 11/1986 | Bambauer et al. | 324/609 |
| 4,756,374 | 7/1988 | Bailey et al. | 177/137 |
| 4,789,033 | 12/1988 | Dohrmann | 177/137 |
| 4,884,644 | 12/1989 | Reichow | 177/137 |

*Primary Examiner*—Peter S. Wong
*Assistant Examiner*—Randy W. Gibson
*Attorney, Agent, or Firm*—Shook, Hardy & Bacon

[57] ABSTRACT

An onboard weighing device for a vehicle is provided which allows the weight sensor to be positioned off-center to accommodate centrally positioned vehicle components while still maintaining the accuracy of the average weight determined by the sensor. The weight sensor is mounted between a fixed point on the vehicle and a center averaging arm. The ends of the averaging arm are coupled with mounting arms which are in turn coupled with spaced apart portions of the suspension. Alternatively, the mounting arms can be coupled with the tandem axles or the drive differentials for those axles. The mounting arms are of different lengths so that the midpoint between the ends of the mounting arms coincides with the mounting point of the weight sensor on the center averaging arm. This results in the effective distance between the sensor and the load points on the axles being substantially equal despite the spacing of the sensor from the true centerline between the load points.

16 Claims, 2 Drawing Sheets

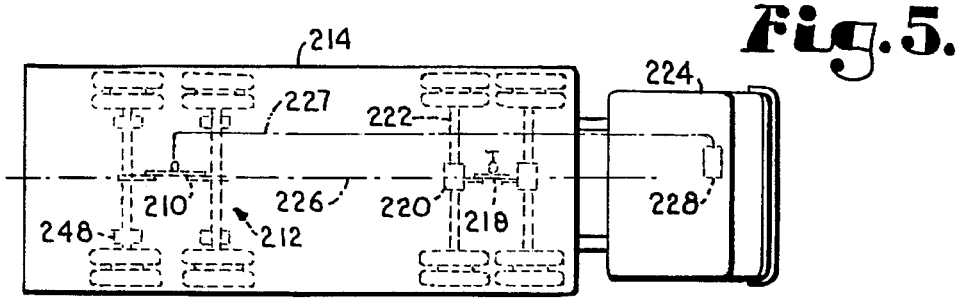
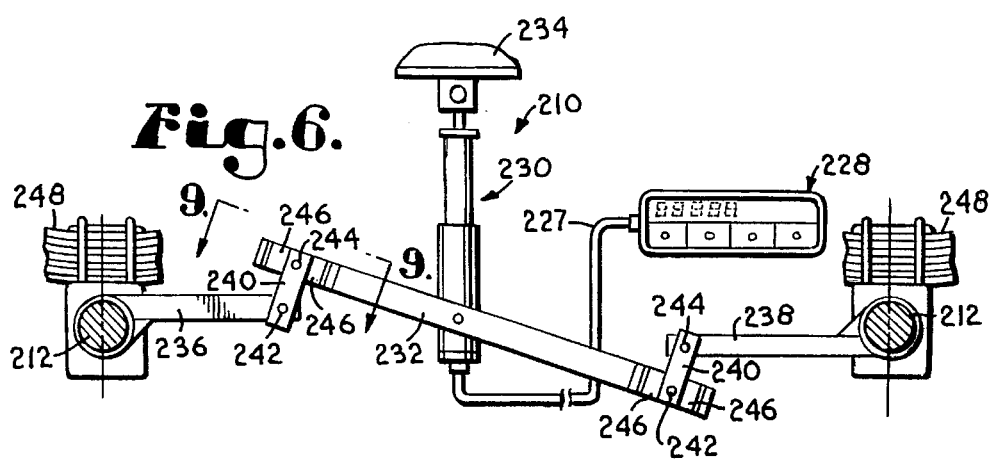
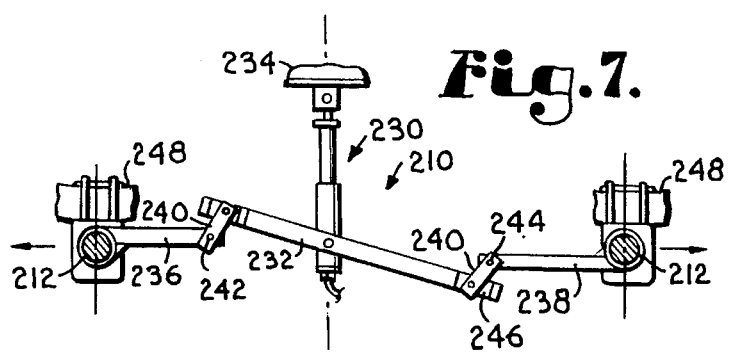
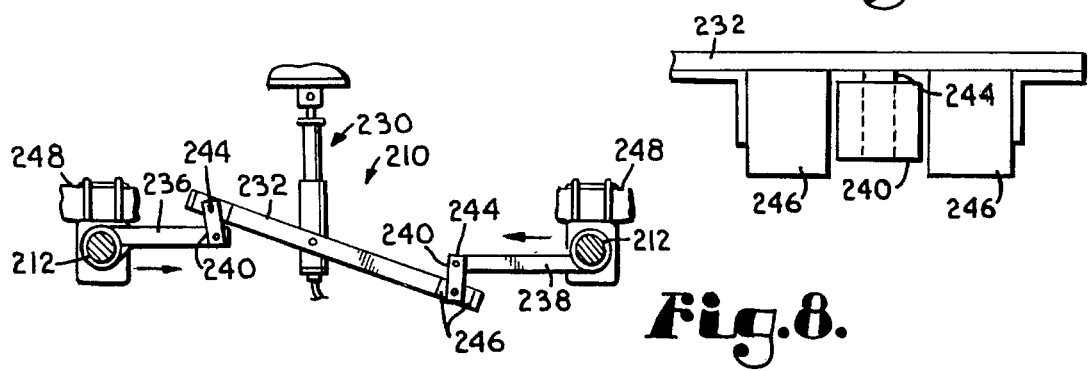

5,522,468

1

ONBOARD WEIGHT INDICATOR FOR MEASURING THE LOAD APPLIED TO A VEHICLE AXLE

BACKGROUND OF THE INVENTION

This invention relates in general to weight measuring devices and, more particularly, to an onboard indicator for measuring the weight of a vehicle.

Onboard weight indicators such as shown in U.S. Pat. Nos. 3,648,790, 3,857,093, 3,955,636, and 4,623,029 are used to determine the weight of a load applied to a vehicle. Indicators of this type generally operate by measuring the deflection of the vehicle springs and then correlating the deflection with a known or calculated weight of the vehicle. A transducer is typically used to measure the spring deflection and a signal is then sent from the transducer to a suitable processor unit which calculates and displays the vehicle weight. These types of onboard weight indicators are particularly advantageous because they allow the vehicle load to be determined while the vehicle is being loaded and without requiring that the vehicle be positioned on a stationary scale.

Many of these conventional types of conventional onboard weight indicators are mounted at opposite ends of each axle on the vehicle. Because of the costs associated with the transducers or other weight sensing portions of the weight indicators, a weight indicator was disclosed in U.S. Pat. No. 4,789,033 which allows a single transducer to be mounted between the tandem axles of a vehicle. This mounting arrangement allows the single transducer to be used to measure the load applied to a set of tandem axles. As a result, significant cost savings can be achieved in comparison to other weighing systems which require that a weight indicator be positioned at each end of every axle on the vehicle.

When using a single weight indicator to measure the deflection of tandem axles, it is important that the transducer be vertically oriented at a central position between the axles. When positioned in this manner, the transducer functions like a fulcrum and more accurately averages the movement experienced by both axles. Similarly, when one indicator is used on a single axle, the associated transducer should be centrally positioned between the ends of the axle to average the load applied to the axle. Often, however, the drive train or components of the vehicle frame interfere with the desired positioning of the transducer on tandem and single axle vehicles. The transducer must then be positioned off-center, with resulting inaccuracies in the measurement of a load applied to the axles. A need has thus arisen for an onboard weight indicator which allows a single transducer to be mounted off-center and still maintain a more accurate averaging of the load applied to a single or tandem axle.

SUMMARY OF THE INVENTION

It is an object of this invention to provide an onboard weight indicator in which the weight sensor can mounted at an off-centered position but can still operate to average the weight applied to a single or tandem axle so that an accurate weight measurement can be obtained despite placement of the sensor at the off-centered position.

It is another object of this invention to provide an onboard weight indicator which uses a single weight sensor to determine the load applied to a single axle or tandem axles so that multiple sensors are not required and which also allows the sensor to be located at positions other than a center point while still providing an accurate measure of the weight applied to the single or tandem axles.

To accomplish these and other related objects of the invention, an onboard weight indicator is provided for measuring the load applied to an axle which is coupled to a vehicle by a suspension. The onboard weight indicator comprises:

an averaging arm having first and second ends;

a first mounting arm coupled with the first end of the averaging arm and a second mounting arm coupled with the second end of the averaging arm;

means for rigidly mounting the first and second mounting arms to spaced apart portions of said vehicle which move in response to movement of the suspension;

a sensor responsive to variations in a distance between a fixed point on the vehicle and said averaging arm, said sensor being coupled with the averaging arm between said opposed ends;

a processor operatively coupled with the sensor for correlating the sensor response to variations in said distance into a weight measurement; and means for coupling the sensor with the fixed point on the vehicle.

The onboard weight indicator can be mounted to the end portions, including the leaf springs, of a single axle or can be mounted to and extend between tandem axles. In a still further embodiment, the indicator can extend between the leaf springs on a Hendrickson-type tandem axle which uses only one pair of leaf springs for the tandem axles. When one of the mounting arms is longer than the other mounting arm, the center averaging point between the leaf springs or axles is displaced a corresponding amount. This allows the sensor to be moved from the centerline between the springs or axles to avoid the drive shaft, differential or other structural member which is normally located at the centerline, but still permits a more accurate averaging of the deflection of the leaf springs or axles.

BRIEF DESCRIPTION OF THE DRAWINGS

Referring now to the drawings which form part of the specification and are to be read in conjunction therewith and in which like reference numerals are used to indicate like parts in the various views:

FIG. 5 is a top plan view of a truck and an attached trailer with phantom lines illustrating a second embodiment of a weight indicator attached between the tandem axles of both the truck and the trailer, the weight indicators being connected to a display located in the cab of the truck;

FIG. 6 is an enlarged side elevation view of the second embodiment of the weight indicator shown in FIG. 5 extending between the trailer tandem axles, portions of the trailer being shown in fragment;

FIG. 7 is a side elevation view of the second embodiment of the weight indicator similar to the view shown in FIG. 6 but showing movement of components of the weight indicator in response to movement of the axles in the direction of the arrows, portions of the trailer being shown in fragment;

FIG. 8 is a side elevation view of the second embodiment of the weight indicator and fragmental portions of the trailer and showing movement of components of the weight indicator in response to movement of the trailer axles in the direction opposite from that shown in FIG. 7; and FIG. 9 is an enlarged fragmentary top plan view of the weight indicator taken along line 9—9 of FIG. 6 in the direction of the arrows and showing the connection between the center averaging arm and the axle mounting.

DESCRIPTION OF THE PREFERRED EMBODIMENTS

Figure 1:
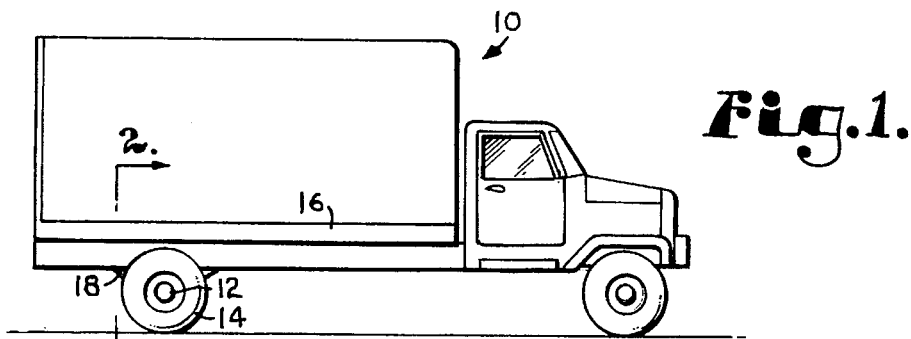
FIG. 1 is a side elevation view of a truck having a single rear axle and employing a first embodiment of a weight indicator constructed in accordance with the present invention.

Referring now to the drawings in greater detail, and initially to FIG. 1, a truck employing an onboard weight indicator is represented by the numeral 10. Truck 10 includes a single rear axle 12 which mounts wheels 14 in a conventional manner. The rear axle 12 is coupled with a covered bed 16 of the truck by a conventional suspension 18.

Figure 2:
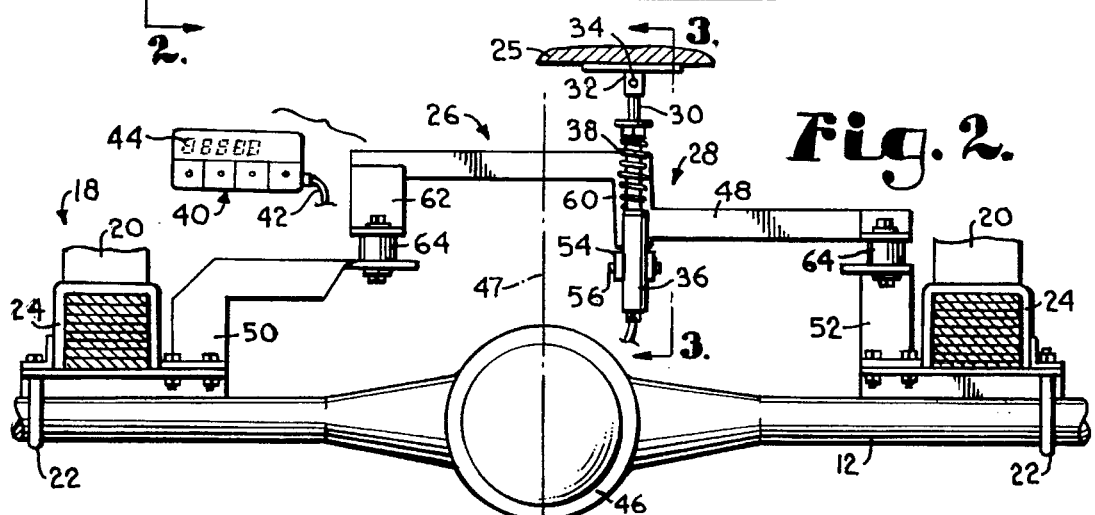
FIG. 2 is an enlarged rear elevation view of the truck shown in FIG. 1 taken in vertical section along line 1—1 of FIG. 1 in the direction of the arrows and showing the weight indicator and fragmental portions of the truck frame.

Turning now to FIG. 2, the suspension 18 includes a set of leaf springs 20 positioned adjacent the opposed ends of the rear axle 12. The leaf springs 20 are connected to the rear axle 12 in any suitable manner such as by U-bolts 22 which extend through a saddle 24 mounted at the bottom of each leaf spring 20. The upper ends of leaf springs 20 are likewise connected to truck frame 25 (FIG. 4) in a conventional manner.

The leaf springs 20 also mount an onboard weight indicator 26 constructed in accordance with a first embodiment of the present invention. Weight indicator 26 includes a sensor 28 which is capable of detecting changes in linear position. Sensor 28 can comprise any of various types of transducers such as those that deliver a signal proportional to the distance between the ends of the transducer. A preferred type of transducer is a conductive plastic film linear position transducer.

Figure 3:
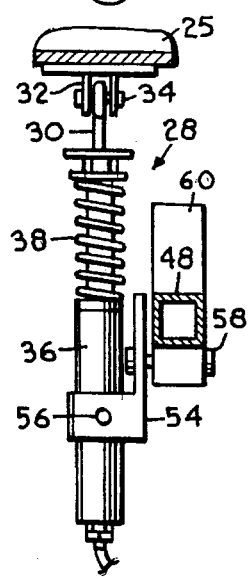
FIG. 3 is a side elevation view of the weight indicator taken in vertical section along line 3—3 of FIG. 2 in the direction of the arrows and showing the manner in which a transducer is mounted to other portions of the weight indicator and the overlying truck bed.

As can best be seen in FIG. 3, the sensor 28 includes an upwardly extending arm 30 which is mounted by a bracket 32 to an undersurface of the frame 25 truck bed 16. A pivot pin 34 extends through an eyehole in the arm 30 and through the bracket 32 to permit the arm 30 to pivot about a fore-and-aft axis. The sensor also includes a housing 36 and a biasing spring 38 which surrounds and protects the internal transducer. The biasing spring 38 resists linear movement of internal components of the sensor 28 and returns those components to their normal position after such movement. The sensor 38 can be inverted from the orientation illustrated in FIG. 3 and the biasing spring 38 can also be positioned internally of a telescoping tube to protect the spring and other internal components of the sensor.

Returning to FIG. 2, the sensor 28 is coupled with a signal processor 40 by a suitable connector 42. The processor 40 can be located at any desired location on the truck 10 such as in the forward cab and can comprise any of various types of devices which are capable of receiving a signal from the sensor 28 and correlating the signal with a weight reading. In a preferred embodiment, the processor 40 is a DC-powered microprocessor which sends a source voltage of a preselected magnitude to the sensor 28 and calculates a weight reading in response to the strength of the return signal received from the sensor 28. The processor 40 is preferably ratiometric to compensate for source voltage variations which can result from various factors such as temperature fluctuations. The processor 40 includes a display 44 for providing a visual readout of the calculated weight or weight differential. An example of suitable processor 40 is a strain meter available from Newport Electronics under the model number INSCS-DL04-BL.

The sensor 28 is preferably mounted in a vertically upright orientation adjacent a rear drive differential 46 which is connected to rear axle 12 and is positioned centrally between the leaf springs 20. It can be seen that the rear drive differential 46 prevents placement of the sensor 28 midway between the leaf springs 20 along centerline 47. As a result of this off-centered placement of the sensor 28, the average weight determined by the sensor would ordinarily be weighted more heavily in favor of the weight applied to the leaf spring closest to the sensor 28.

In order to compensate for the sensor 28 being closer to one leaf spring 20 than it is to the other leaf spring, the sensor is mounted to a center averaging arm 48 which is connected at both ends to mounting arms 50 and 52 that are fixed to the leaf spring saddles 24. The mounting arms 50 and 52 are rigidly fixed to the saddles 24 and move up and down in response to deflection of the leaf springs 20. The lengths of the respective mounting arms 50 and 52 are selected so that each is connected to the averaging arm 48 at a point equally spaced from the sensor 28. To achieve this equal spacing, the mounting arm 52 connected to the leaf spring 20 which is closest to the sensor 28 extends centrally a shorter distance than the other mounting arm 50. This allows the sensor 28 to be offset from the centerline 47 between the leaf springs 20 and yet remain centrally positioned between the points at which the center averaging arm 48 connects to the mounting arms 50 and 52.

Figure 4:
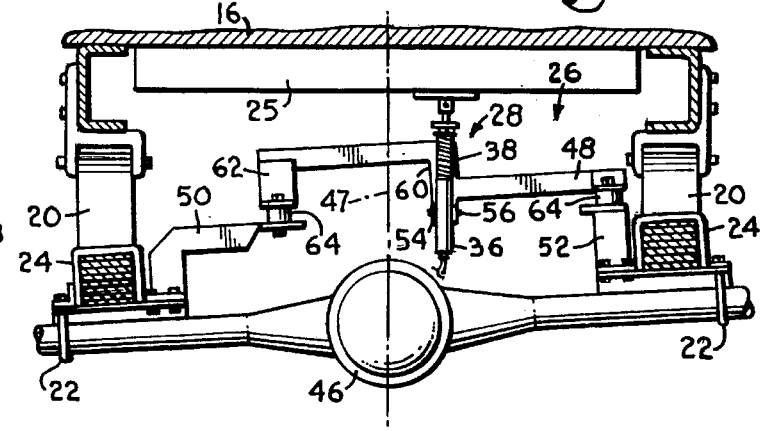
FIG. 4 is a fragmentary rear elevation view of the truck and similar to the view shown in FIG. 2 but showing one side of the truck deflected upwardly to illustrate movement of the weight indicator when the truck encounters a bump in the road.

The sensor housing 36 is connected to the horizontal centerpoint of the center averaging arm 48 by a suitable clevis-type bracket 54. A pivot pin 56 connects the bracket 54 to the housing 36 and another pivot pin 58 connects the bracket 54 to the averaging arm 48. The pivot pins 56 and 58 permit limited fore-and-aft and sideways movement of the lower portion of the sensor 28 in response movement of the rear axle 12, such as is illustrated in FIG. 4. This then allows the sensor 28 to be maintained in a generally vertically upright position despite unequal deflection of the leaf springs 20. By maintaining the sensor 28 in an upright position, greater accuracy can be achieved in measuring the load applied to the axle 12.

The center averaging arm 48 can be formed from any suitably rigid material such as square tubing. To provide the necessary clearance between the averaging arm 48 and the rear drive differential 46 or drive shaft (not shown), a center dog-leg 60 is utilized to elevate that portion of the averaging arm which extends over the differential or drive shaft. A suitable spacer 62 is then provided at the end of the elevated portion of the averaging arm 48 so that both ends of the averaging arm are connected to the respective mounting arms 50 and 52 in the same horizontal plane.

The mounting arms 50 and 52 include a lower portion which is mounted to the leaf spring saddle 24 and extends upwardly to provide additional vertical clearance for the center averaging arm 48. The mounting arm 50 furthest from the sensor 28 also includes a second portion which extends centrally at a 90° angle to provide the necessary spacing from the sensor 28. The ends of the mounting arms 50 and 52 are then bolted or otherwise connected to the respective ends of center averaging arm 48 with a rubber mounting 64 being positioned between the arms to permit limited movement of the averaging arm in relation to the mounting arms.

In use, the onboard weight indicator 26 allows the weight of the load applied to the axle 12 to be determined by averaging the deflection of the leaf springs 20. Even though the sensor 28 is positioned off-center from the centerline 47 between the leaf springs 20, the use of the averaging arm 48 and mounting arms 50 and 52 shifts the effective centerline so that it is aligned with the sensor 28. This allows the weight determined by the sensor to more accurately reflect the average deflection of both leaf springs 20.

The shifting of the effective centerline is achieved by using the longer mounting arm 50 to shift the attachment point of the associated end of the averaging arm 48 to a point spaced inwardly from the leaf spring 20. Because the mounting arms 50 and 52 are fixed to and move rigidly with the leaf springs 20, the pivot pin 58 which connects the sensor 28 to the center averaging arm 48 becomes the fulcrum about which the averaging arm 48 moves. The vertical movement of the fulcrum in relation to the overlying truck frame 25 is then sensed by the sensor 28 and can be correlated to a weight reading by processor 40. Notably, the average deflection of the two leaf springs 20 can be determined while still allowing the sensor 28 to be mounted away from drive shafts, differentials, and other components which interfere with the central placement of the sensor.

It will be appreciated that the weight indicator 26 can be used with many types of vehicles in addition to truck 10. As used herein, the term "vehicle" is intended to encompass wheeled apparatus such as cars and trailers, in addition to trucks. It will also be appreciated that the mounting arms 50 and 52 need not be mounted to the leaf spring saddles 24 but can instead be mounted directly to the leaf springs 20, the axle 12, or other portions of the suspension 18.

Turning now to FIGS. 5–9, a second embodiment of an onboard weight indicator suitable for use with tandem axles will now be described. One weight indicator 210 is shown in FIG. 5 mounted to the tandem axles 212 of a trailer 214 while another weight indicator 218 is mounted to the drive differentials 220 of the tandem drive axles 222 of the truck 224 which is attached to trailer 214. The weight indicators 210 and 218 are positioned along a centerline 226 of the trailer 214 and truck 224 and are coupled by connector 227 with a display processor 228 located in the cab of the truck. Because weight indicators 210 and 218 are constructed in the same manner and differ only in that weight indicator 210 is connected to the axles 212 while weight indicator 218 is connected to the drive differentials 220, for purposes of brevity only weight indicator 210 will be described. In addition, components which have previously been referenced with respect to weight indicator 26 will not be described in detail.

Weight indicator 210 is constructed in a manner generally similar to the single axle weight indicator 26 previously described and comprises a sensor 230 mounted to a center averaging arm 232 and trailer frame 234. The ends of the center averaging arm 232 are connected to mounting arms 236 and 238 which are in turn fixed to the respective axles 212. The mounting arms 236 and 238 are rigidly connected to the axles 212 and extend toward each other but in slightly different horizontal planes. In some applications, it may be desired or preferred to place the mounting arms in the same horizontal plane. For example, when additional ground clearance is needed for the averaging arm 232, both mounting arms 236 and 238 can extend centrally from the upper portion of the axles 212.

As illustrated, mounting arm 238 is slightly longer than mounting arm 236 to allow the sensor 230 to be mounted closer toward rear axle 212, such as may be necessary when a structural member would interfere with center placement of the sensor. It will, of course, be appreciated, that the difference between the lengths of the mounting arms 236 and 238 can be greater or less than that shown.

Each end of center averaging arm 232 is connected to the associated mounting arm 236 or 238 by a stub shaft 240 and pivot pins 242 and 244 which allow for a slight orbiting rotation of the averaging arm 232 about the end of the mounting arms 236 and 238. As can best be seen in FIG. 9, a pair of rubber bushings 246 are mounted to the center averaging arm 232 on both sides of the stub shafts 240. The rubber bushings 246 exert a biasing force on the stub shafts 240 to return them to the desired position following any movement of the center averaging arm 232 about pivot pins 242.

The use of stub shafts 240 to connect the center averaging arm 232 to the mounting arms 236 and 238 allows the sensor 230 to be maintained in a generally vertically upright position despite movement of the axles 212 away from each other as shown in FIG. 7 or toward each other as shown in FIG. 8. Advantageously, this allows a more accurate weight reading to be obtained when leaf springs 240 are deflected unequal amounts, such as when the trailer 214 is on an uneven road surface.

In operation, weight indicator 218 functions to more accurately average the load applied to each axle 212 while still permitting the sensor 230 to be positioned away from centrally positioned structural or other members. The operation of weight indicator 218 is otherwise similar to the operation of weight indicator 26 which has been previously described.

It will be appreciated that the weight indicator of the present invention can be used with other types of suspension systems such as Hendrickson tandem axles which utilize a single set of leaf springs. In such an application, the mounting arms would be mounted to the leaf springs in the same manner previously described with respect to the single axle weight indicator 26. Other variations are also possible and are within the scope of the invention.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An onboard weight indicator for measuring the load applied to an axle which is coupled to a vehicle by a suspension, said onboard weight indicator comprising:

an averaging arm having a first end and a second end;

a first mounting arm coupled with the first end of the averaging arm and a second mounting arm coupled with the second end of the averaging arm;

means for rigidly mounting the first and second mounting arms to spaced apart portions of said vehicle which move in response to movement of the suspension;

a sensor responsive to variations in a distance between a fixed point on the vehicle and said averaging arm, said sensor being coupled with the averaging arm between said first end and said second end;

a processor operatively coupled with the sensor for correlating the sensor response to variations in said distance into a weight measurement; and means for coupling the sensor with the fixed point on the vehicle.

2. The onboard weight indicator as set forth in claim 1, including a resilient mounting between the averaging arm and each mounting arm.

3. The onboard weight indicator as set forth in claim 2, including a stub shaft pivotally connecting each mounting arm to the associated end of the mounting arm.

4. The onboard weight indicator as set forth in claim 3, including biasing means carried on the mounting arm and exerting a biasing force on the stub shaft to return the mounting arm to a normal position after pivoting movement from said normal position.

5. An onboard weight indicator in combination with a vehicle having a frame and a wheeled axle coupled with the frame by a suspension, said onboard weight indicator comprising:

an averaging arm having a first end and a second end;

a first mounting arm coupled with the first end of the averaging arm and a second mounting arm coupled with the second end of the averaging arm, said first and second mounting arms being rigidly mounted to spaced apart portions of said vehicle which move in response to movement of the suspension;

a sensor responsive to variations in a distance between a fixed point on the vehicle and said averaging arm, said sensor being coupled with the averaging arm between said first end and said second end and extending between said averaging arm and a fixed point on said vehicle; and a processor operatively coupled with the sensor for correlating the sensor response to variations in said distance into a weight measurement.

6. The onboard weight indicator as set forth in claim 5, wherein said first mounting arm extends closer to a centerline between said spaced apart portions of the vehicle than the second mounting arm and wherein said sensor is spaced from said centerline and is centrally positioned between portions of the averaging arm which couple the mounting arms.

7. The onboard weight indicator as set forth in claim 6, including a resilient mounting between the averaging arm and each mounting arm.

8. The onboard weight indicator as set forth in claim 6, wherein said vehicle includes springs positioned between the axle and frame and wherein said mounting arms are rigidly mounted to said springs.

9. The onboard weight indicator as set forth in claim 6, wherein said vehicle includes a second wheeled axle and said indicator extends between the first mentioned axle and said second axle.

10. The onboard weight indicator as set forth in claim 6, wherein said vehicle includes a second wheeled axle and springs positioned between said axles and said frame and wherein said indicator is coupled with and extends between said springs.

11. The onboard weight indicator as set forth in claim 6, including a stub shaft pivotally connecting each mounting arm to the associated end of the mounting arm.

12. The onboard weight indicator as set forth in claim 11, including biasing means carried on the mounting arm and exerting a biasing force on the stub shaft to return the mounting arm to a normal position after pivoting movement from said normal position.

13. An onboard weight indicator in combination with a vehicle having a frame and wheeled tandem axles coupled with the frame by a suspension, said onboard weight indicator comprising:

an averaging arm having a first end and a second end;

a first mounting arm coupled with the first end of the averaging arm and a second mounting arm coupled with the second end of the averaging arm, said first mounting arm being rigidly mounted to one of the tandem axles and the second mounting arm being rigidly mounted to the other of the tandem axles;

a sensor responsive to variations in a distance between a fixed point on the vehicle and said averaging arm, said sensor being coupled with the averaging arm between said first end and said second end and extending between said averaging arm and a fixed point on said vehicle; and a processor operatively coupled with the sensor for correlating the sensor response to variations in said distance into a weight measurement.

14. The onboard weight indicator as set forth in claim 13, wherein said first mounting arm extends closer to a centerline between said tandem axles than the second mounting arm and wherein said sensor is spaced from said centerline and is centrally positioned between portions of the averaging arm which couple the mounting arms.

15. The onboard weight indicator as set forth in claim 14, including a stub shaft pivotally connecting each mounting arm to the associated end of the mounting arm.

16. The onboard weight indicator as set forth in claim 14, including biasing means carried on the mounting arm and exerting a biasing force on the stub shaft to return the mounting arm to a normal position after pivoting movement from said normal position.

\* \* \* \* \*